(12) United States Patent
Takahashi et al.

(10) Patent No.: US 12,156,231 B2
(45) Date of Patent: Nov. 26, 2024

(54) TERMINAL AND RADIO COMMUNICATION METHOD

(71) Applicant: NTT DOCOMO, INC., Tokyo (JP)

(72) Inventors: Yuki Takahashi, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 337 days.

(21) Appl. No.: 17/628,726

(22) PCT Filed: Jul. 23, 2019

(86) PCT No.: PCT/JP2019/028918
§ 371 (c)(1),
(2) Date: Jan. 20, 2022

(87) PCT Pub. No.: WO2021/014594
PCT Pub. Date: Jan. 28, 2021

(65) Prior Publication Data
US 2022/0264625 A1    Aug. 18, 2022

(51) Int. Cl.
*H04W 72/23* (2023.01)
*H04W 72/1268* (2023.01)

(52) U.S. Cl.
CPC ....... *H04W 72/23* (2023.01); *H04W 72/1268* (2013.01)

(58) Field of Classification Search
CPC .......................... H04W 72/1268; H04W 72/23

USPC ......................................................... 370/329
See application file for complete search history.

(56) References Cited

U.S. PATENT DOCUMENTS

| | | | |
|---|---|---|---|
| 2019/0132106 A1* | 5/2019 | Tang | H04J 11/00 |
| 2019/0173619 A1* | 6/2019 | Li | H04L 27/2605 |
| 2019/0253219 A1* | 8/2019 | Fan | H04L 5/001 |
| 2020/0367208 A1* | 11/2020 | Khoshnevisan | H04L 5/0048 |
| 2021/0282137 A1* | 9/2021 | Wang | H04W 72/23 |

OTHER PUBLICATIONS

International Search Report issued in PCT/JP2019/028918 on Jan. 28, 2020 (1 page).
Written Opinion of the International Searching Authority issued in PCT/JP2019/028918 on Jan. 28, 2020 (3 pages).
CATT; "PUSCH enhancements for URLLC"; 3GPP TSG RAN WG1 Meeting #97, R1-1906329; Reno, USA; May 13-17, 2019 (11 pages).
Sharp; "Views on enhancements to PUSCH for eURLLC"; 3GPP TSG RAN WG1 Meeting #96bis, R1-1905397; Xi'an, China; Apr. 8-12, 2019 (9 pages).

(Continued)

*Primary Examiner* — Peter G Solinsky
(74) *Attorney, Agent, or Firm* — Osha Bergman Watanabe & Burton LLP

(57) ABSTRACT

A terminal according to one aspect of the present disclosure includes: a receiving section that receives information indicating or configuring uplink channel transmission; and a control section that, when at least one of a plurality of uplink channel transmissions configured in one slot includes a symbol unavailable for the uplink channel transmission, controls not to transmit the uplink channel in at least the symbol.

8 Claims, 14 Drawing Sheets

(56) References Cited

OTHER PUBLICATIONS

Panasonic; "Discussion on URLLC enhancements for grant-free transmission"; 3GPP TSG RAN WG1 #96, R1-1902396; Athens, Greece; Feb. 25-Mar. 1, 2019 (9 pages).
Panasonic; "On PUSCH enhancements for NR URLLC"; 3GPP TSG RAN WG1 #96, R1-1902447; Athens, Greece; Feb. 25-Mar. 1, 2019 (10 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action in the counterpart Japanese Application No. 2021-534470, mailed Jun. 27, 2023 (6 pages).
Huawei, HiSilicon:"PUSCH enhancements for URLLC", 3GPP TSG RAN WG1 Meeting #96, R1-1901559; Athens, Greece, Feb. 25-Mar. 1, 2019 (13 pages).
CATT: "On PUSCH enhancements for URLLC", 3GPP TSG RAN WG1 Meeting #96, R1-1902004; Athens, Greece, Feb. 25-Mar. 1, 2019 (6 pages).
Notice of Reasons for Refusal issued in Japanese Application No. 2021-534470, mailed on Apr. 4, 2023 (6 pages).
ZTE:"Grant-based PUSCH Enhancements for URLLC"; 3GPP TSG RAN WG1 Meeting #96, R1-1901769; Athens, Greece, Feb. 25-Mar. 1, 2019 (8 pages).
Intel Corporation: "On enhancements to PUSCH for eURLLC"; 3GPP TSG RAN WG1 RAN1 #96, R1-1902495; Athens, Greece, Feb. 25-Mar. 1, 2019 (7 pages).
LG Electronics:"Enhanced UL configured grant transmission for NR URLLC"; 3GPP TSG RAN WG1 #96, R1-1904632; Athens, Greece, Feb. 25-Mar. 1, 2019 (6 pages).
InterDigital Inc.:"On PUSCH Enhancements for eURLLC"; 3GPP TSG RAN WG1 #97, R1-1907109; Reno, USA, Apr. 13-17, 2019 (3 pages).

\* cited by examiner

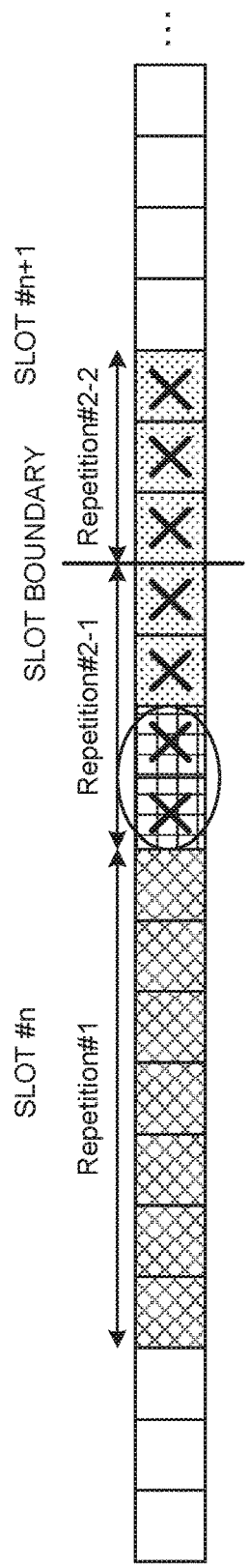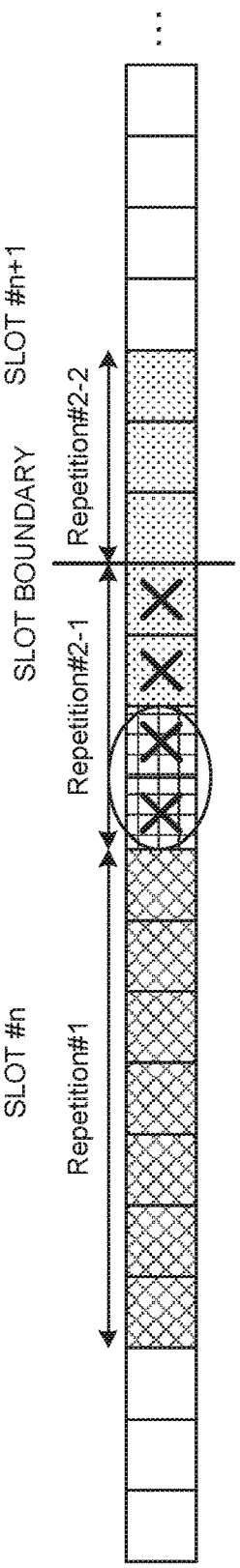

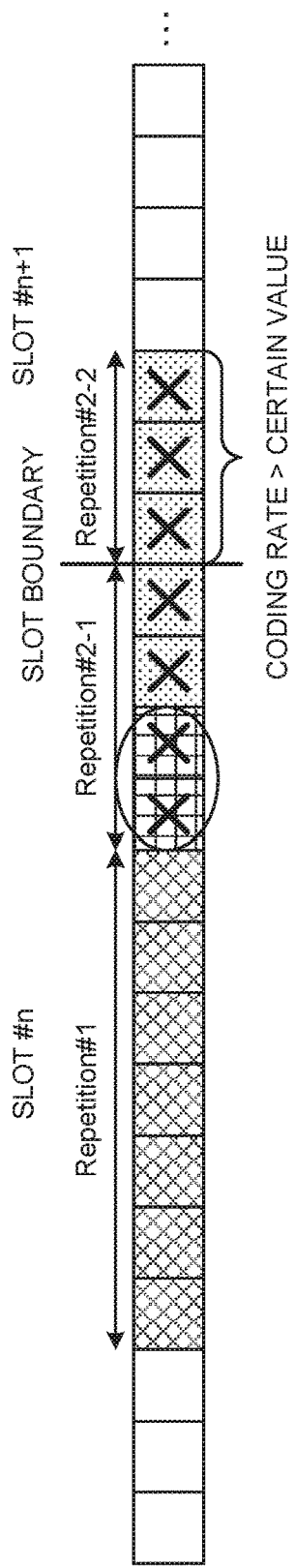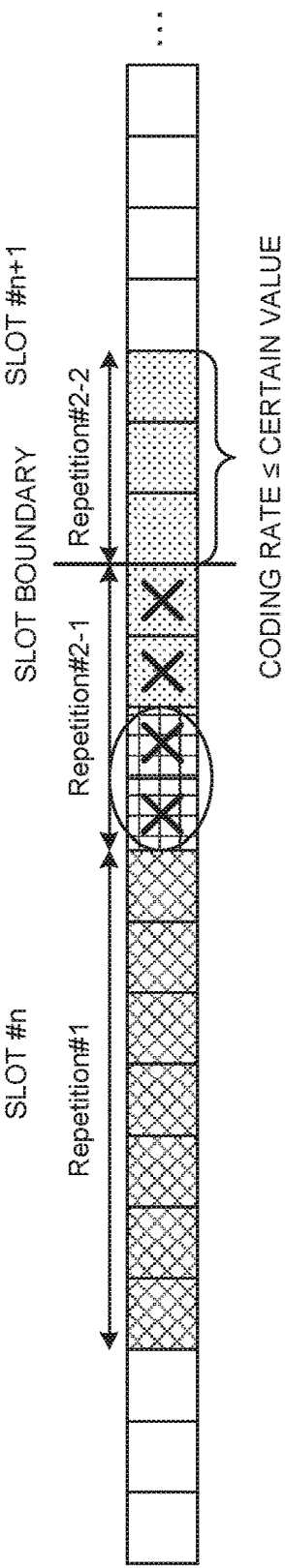

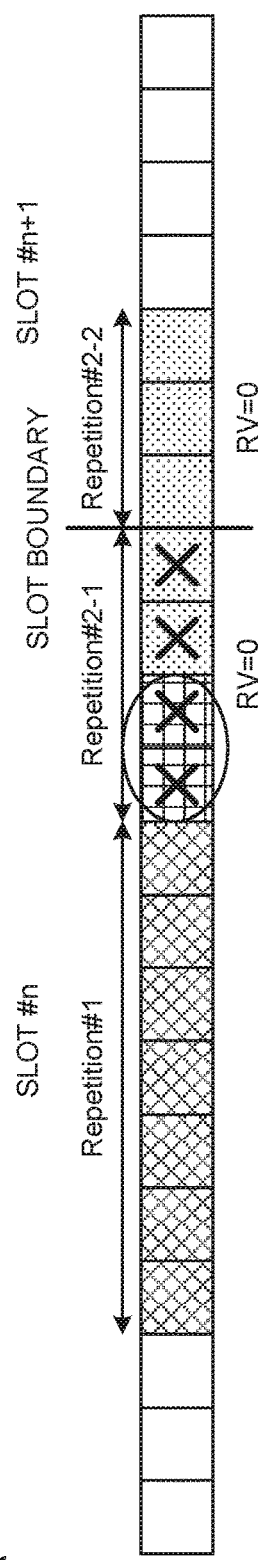
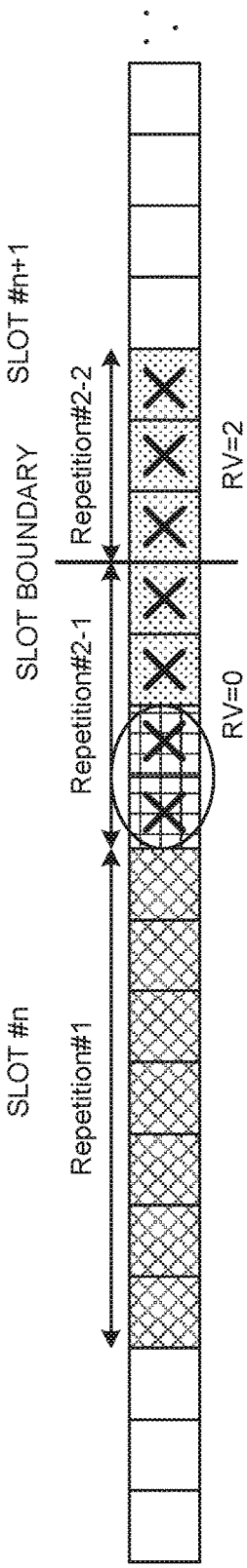
FIG. 10A
FIG. 10B

TERMINAL AND RADIO COMMUNICATION METHOD

TECHNICAL FIELD

The present disclosure relates to a terminal and a radio communication method in next-generation mobile communication systems.

BACKGROUND ART

In the universal mobile telecommunications system (UMTS) network, the specifications of long term evolution (LTE) have been drafted for the purpose of further increasing data rates, providing low delays, and so on (see Non Patent Literature 1). In addition, the specifications of LTE-Advanced (3rd generation partnership project (3GPP) Release (Rel.) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), New Radio (NR), or 3GPP Rel. 15 or later) are also being studied.

In the existing LTE system (for example, 3GPP Rel. 8 to 14), a user terminal (user equipment (UE)) controls reception of a downlink shared channel (for example, a physical downlink shared channel (PDSCH)) based on downlink control information (DCI, also referred to as DL assignment or the like) from a base station. Also, the user terminal controls transmission of an uplink shared channel (for example, a physical uplink shared channel (PUSCH)) based on DCI (also referred to as UL grant or the like).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In a future radio communication system (for example, New Radio (NR)), it is considered to transmit at least one of a plurality of channels or a plurality of signals (also referred to as channels/signals) by using a time unit shorter than a slot (for example, a mini slot or a given number of symbols). For example, it is assumed that transmission of a plurality of channels/signals (also referred to as repetitive transmission) is configured within one slot.

Alternatively, in NR, it is also considered that transmission of a channel/signal is configured over a slot boundary (or across the slot boundary). In this case, it is also assumed that transmission or reception of the channel/signal configured over the slot boundary is controlled while being divided into a plurality of segments.

In addition, since downlink (DL) transmission or uplink (UL) transmission in units of symbols is supported in NR, it is also conceivable that a time domain that is unavailable for transmission of a given channel/signal occurs in at least a part of a time domain used for transmission of the given channel/signal. The transmission of the given channel/signal may be one of multiple mini-slot-based transmissions or may be one of multiple segments. However, how to control the transmission of the given channel/signal in such a case has not been sufficiently studied.

An object of the present disclosure is to provide a terminal and a radio communication method capable of appropriately performing communication even in a case where a part of a time domain used for transmission of a given channel/signal is unavailable.

Solution to Problem

A terminal according to an aspect of the present disclosure includes: a receiving section that receives information indicating or configuring uplink channel transmission; and a control section that, when at least one of a plurality of uplink channel transmissions configured in one slot includes a symbol unavailable for the uplink channel transmission, controls not to transmit the uplink channel in at least the symbol.

Advantageous Effects of Invention

According to an aspect of the present disclosure, it is possible to appropriately perform communication even in a case where a part of a time domain used for transmission of a given channel/signal is unavailable.

BRIEF DESCRIPTION OF DRAWINGS

FIGS. 8A and 8B are diagrams illustrating an example of a control of PUSCH transmission using a plurality of segments.

FIGS. 9A and 9B are diagrams illustrating another example of the control of PUSCH transmission using a plurality of segments.

FIGS. 10A and 10B are diagrams illustrating another example of the control of PUSCH transmission using a plurality of segments.

DESCRIPTION OF EMBODIMENTS

In existing systems (for example, 3rd Generation Partnership Project (3GPP) Rel. 15), channel/signal transmission is scheduled on a slot basis. For example, in a case where repetitive transmission of an uplink (UL) channel/UL signal is configured, a UE performs the transmission of the UL channel/UL signal in a plurality of slots based on the number K of repetition (or a repetition factor K).

For the UE, the transmission of the UL channel/UL signal may be configured on a carrier using time division duplex (TDD) (or unpaired spectrum). For example, for the UE, transmission of at least one of a sounding reference signal (SRS), a physical uplink control channel (PUCCH), a physical uplink shared channel (PUSCH), or a physical random access channel (PRACH) may be configured by higher layer signaling.

Figure 1:
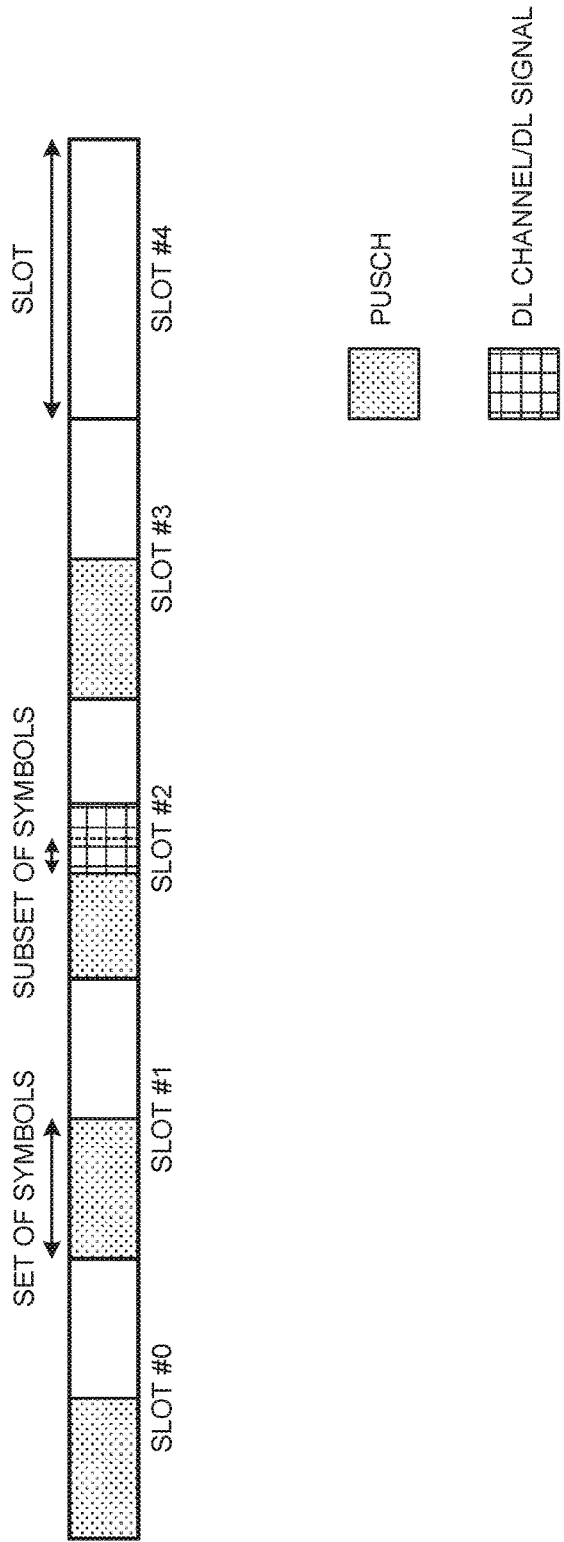
FIG. 1 is a diagram illustrating an example of a case where slot-based physical uplink shared channel (PUSCH) repetitive transmission and a downlink (DL) channel/DL signal collide with each other.

FIG. 1 illustrates an example of PUSCH repetitive transmission in a case where the repetition factor K is 4. Here, a case where the PUSCH is transmitted in contiguous slots #0 to #3 is illustrated. A time domain used for transmission of the PUSCH in each slot (for example, one symbol) may be referred to as a set of symbols). The repeatedly transmitted PUSCH may include, for example, the same transport block.

On the other hand, there is also a case where a downlink (DL) channel/DL signal is scheduled or configured in a partial region of the set of symbols used for transmission of the UL channel/UL signal configured by higher layer signaling or the like (the slot #2 in FIG. 1). FIG. 1 illustrates a case where the DL channel/DL signal is allocated to a region overlapping the symbols (the set of symbols) of the slot #2 to which the PUSCH is allocated.

The partial region of the set of symbols used for the transmission of the UL channel/UL signal may be referred to as a subset of symbols. The DL channel/DL signal may be at least one of a downlink shared channel (PDSCH) or channel state information (CSI-RS).

For example, a case is considered in which the DL channel/DL signal notified by downlink control information (for example, a given DCI format) is allocated to at least a partial region (the subset of symbols) of the set of symbols used for the transmission of the UL channel/UL signal. The given DCI format may be a DCI format 1_0, 1_1, or 0_1.

Alternatively, it is also conceivable that at least the partial region of the set of symbols is designated for a configuration (DL or flexible) other than the UL by the DCI format (for example, a DCI format 2_0) used for designating a slot format.

In a case where a period from the notification of the downlink control information (DCI) to the subset of symbols is a certain value or more, the UE may perform a control not to perform the transmission of the UL channel/UL signal overlapping the DL channel/DL signal. For example, the UE receives the DL channel/DL signal indicated by the DCI, and cancels (or drops) the transmission of the UL channel/UL signal in a region (the remaining symbols) that does not overlap with the subset of symbols in the set of symbols.

As described above, in a configuration in which the UL transmission is allocated in units of slots, the DL channel/DL signal may be allocated to at least the partial region (the subset of symbols) of the set of symbols configured for the transmission of the UL channel/UL signal in one slot. In such a case, the UE may cancel the transmission of the UL channel/UL signal in the slot.

Note that, in a case where a period from a DL channel/DL signal transmission indication (for example, the DCI or a control resource set) to transmission of the DL channel/DL signal is shorter than a PUSCH preparation period (or UE capability) of the UE, it may be assumed that the PUSCH is not canceled.

Meanwhile, in New Radio (NR), transmission of a channel/signal using a time unit (for example, a mini slot or a given number of symbols) shorter than a slot has been studied. For example, a plurality of channel/signal transmissions (also referred to as repetitive transmission (repetition)) in one slot is supported (see FIG. 2). In this case, it can also be considered that a set of symbols in one slot includes a plurality of UL channels/UL signals.

Figure 2:
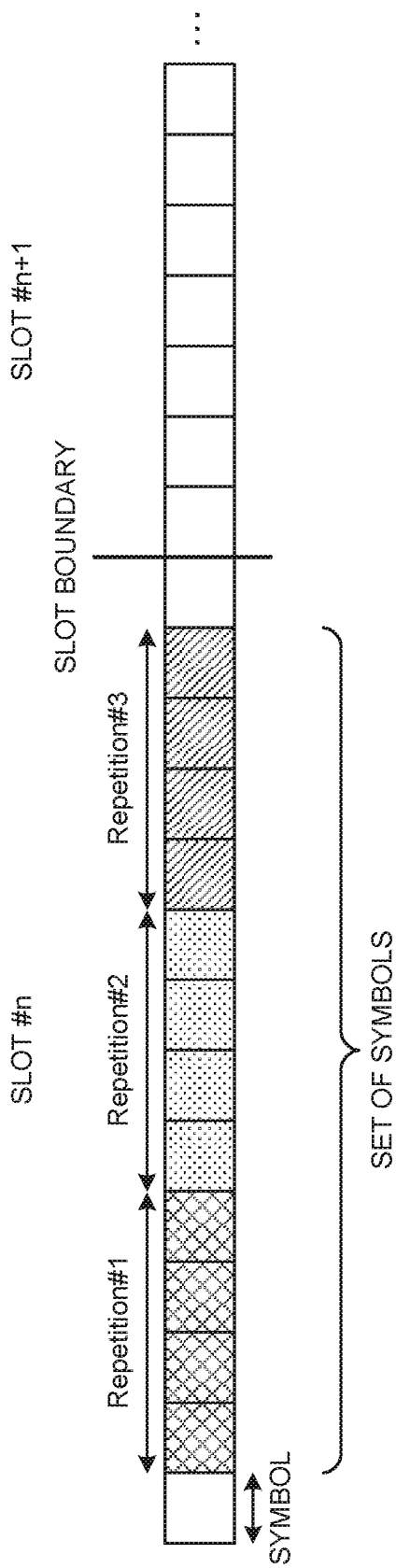
FIG. 2 is a diagram illustrating an example of a case where a plurality of PUSCH transmissions are configured in one slot.

In FIG. 2, in a plurality of UL channel/UL signal transmissions included in one slot, some symbols may be unavailable for the UL transmission (for example, the symbols are used for DL channel/DL signal allocation). For example, some symbols for one of a plurality of UL transmissions (repetitions #1 to #3) included in a set of symbols may be unavailable for UL transmission. In such a case, how to control the plurality of UL channel/UL signal transmissions becomes a problem.

The present inventors have studied a transmission control in a case where some symbols are unavailable for UL transmission for a plurality of UL channels/UL signals configured in one slot, and conceived one aspect of the present invention.

(Multi-Segment Transmission)

Alternatively, in the NR, transmission of a channel/signal over a slot boundary is also considered. In this case, it is also assumed that transmission or reception of the channel/signal configured over the slot boundary is controlled while being divided into a plurality of segments (see FIG. 3).

In an existing system (for example, 3GPP Rel. 15), it has been considered that the UE allocates a time domain resource (for example, a given number of symbols) within a single slot to an uplink shared channel (for example, the PUSCH) or a downlink shared channel (for example, the PDSCH) of a certain transmission occasion (also referred to as a period, an occasion, or the like).

The UE may transmit one or more transport blocks (TB) by using a PUSCH allocated to a given number of contiguous symbols in a slot in a certain transmission occasion. In addition, the UE may transmit one or more TBs by using a PDSCH allocated to a given number of contiguous symbols in a slot in a certain transmission occasion.

Figure 3:
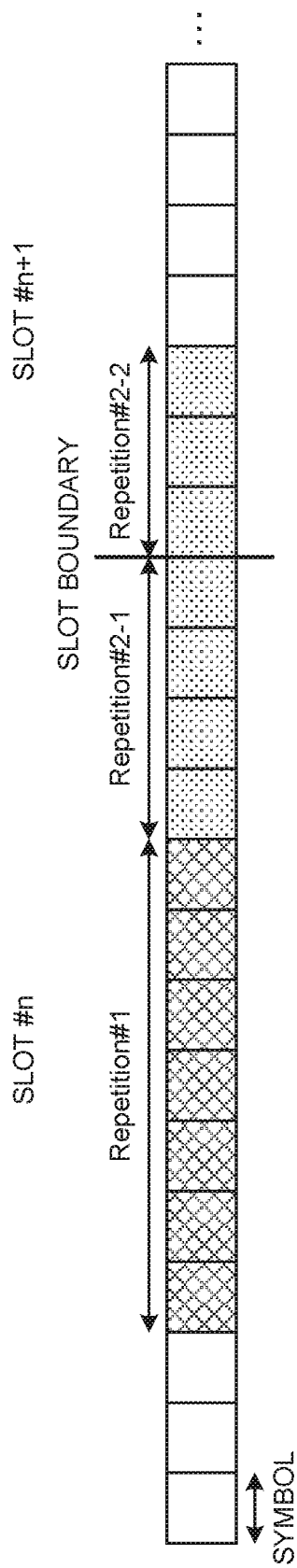
FIG. 3 is a diagram illustrating an example of multi-segment transmission.

On the other hand, in the NR, as illustrated in FIG. 3, it is also assumed that a time domain resource is allocated to a PUSCH or a PDSCH of a certain transmission occasion across a slot boundary (or across a plurality of slots). FIG. 3 illustrates a case where a PUSCH is allocated across a slot boundary in addition to a PUSCH allocated to a given number of contiguous slots (here, seven symbols) in one slot.

Specifically, a PUSCH allocated to symbols #10 to #13 in a slot #n and symbols #0 to #3 in a slot #n+1 is transmitted across the slot boundary. Furthermore, as illustrated in FIG. 3, it is also assumed that, in a case where repetitive transmission of the PUSCH is performed over a plurality of transmission occasions, at least some of the transmission occasions or the repetitive transmission is performed across the slot boundary.

Transmission of a channel/signal using the time domain resource allocated across the slot boundary (over a plurality of slots) is also referred to as multi-segment transmission, two-segment transmission, cross-slot boundary transmission, discontinuous transmission, multi-division transmission, and the like. Similarly, reception of a channel/signal transmitted across the slot boundary is also referred to as multi-segment reception, two-segment reception, cross-slot boundary reception, discontinuous reception, multi-division reception, and the like.

FIG. 3 illustrates a case where each segment is divided on the basis of the slot boundary, but a reference for division into each segment is not limited to the slot boundary. In addition, in the following description, a case where the symbol length of the PUSCH is seven symbols will be described, but the symbol length is not limited thereto, and the same applies as long as the symbol length is longer than two symbols.

In FIG. 3, the UE may control transmission of the PUSCH allocated (or scheduled) in one slot or the PUSCH allocated across a plurality of slots on the basis of a given number of segments. In a case where the time domain resource over one or more slots is allocated to the PUSCH in a certain transmission occasion, the UE may divide (or split) the PUSCH into a plurality of segments and control transmission processing. For example, the UE may map each segment obtained by the division on the basis of the slot boundary to a given number of allocation symbols in the slot corresponding to each segment.

Here, the "segment" may be a given number of symbols in each slot allocated to one transmission occasion or data transmitted with the given number of symbols. For example, in a case where a head symbol of the PUSCH allocated in one transmission occasion is in a first slot and a tail symbol is in a second slot, for the PUSCH, one or more symbols included in the first slot may correspond to a first segment and one or more symbols included in the second slot may correspond to a second segment.

Note that the "segment" is a given data unit, and may be at least some of one or more TBs. For example, each segment may include one or more TBs, one or more code blocks (CBs), or one or more code block groups (CBGs). Note that one CB is a unit for encoding of the TB, and the TB may be divided into one or more segments (CB segmentation). In addition, one CBG may include a given number of CBs. Note that the segment obtained by the division may be referred to as a short segment.

The size (the number of bits) of each segment may be determined on the basis of, for example, at least one of the number of slots to which the PUSCH is allocated, the number of allocation symbols in each slot, or a proportion of the number of allocation symbols in each slot. Furthermore, the number of segments may be determined on the basis of the number of slots to which the PUSCH is allocated.

For example, the PUSCH allocated to the symbols #3 to #9 in the slot #n is transmitted within a single slot (single segment) without crossing the slot boundary. As described above, the transmission of the PUSCH without crossing the slot boundary (the transmission of the PUSCH using a given number of symbols allocated in a single slot) may be referred to as single-segment transmission, one-segment transmission, non-segmented transmission, or the like.

In addition, as illustrated in FIG. 3, in a case where repetitive transmission of the PUSCH is performed over a plurality of transmission occasions, the multi-segment transmission may be applied to at least some transmission occasions. For example, in FIG. 3, transmission of the PUSCH is repeated twice, the single-segment transmission is applied to the first PUSCH transmission, and the multi-segment transmission is applied to the second PUSCH transmission.

Further, the repetitive transmission may be performed in one or more time units. Each transmission occasion may be provided in each time unit. Each time unit may be, for example, a slot or a time unit shorter than the slot (also referred to as, for example, a mini slot, a sub-slot, a half-slot, or the like).

Further, the repetitive transmission may be referred to as slot-aggregation transmission, multi-slot transmission, or the like. A repetition number N (the number of aggregations or aggregation factor) may be specified for the UE by at least one of a higher layer parameter (for example, an RRC IE "pusch-AggregationFactor" or "pdsch-AggregationFactor") or DCI. Further, the transmission occasion, the repetition, the slot, the mini slot, or the like can be replaced with each other.

As described above, it is assumed that the PUSCH (also referred to as a nominal PUSCH) indicated to be allocated (or scheduled) crosses the slot boundary or a case where there are symbols (for example, DL or flexible) unavailable for PUSCH transmission in a range of one transmission (for example, seven symbols). In such a case, it is conceivable that the UE divides the PUSCH into a plurality of segments (or repetition) and controls the transmission.

Meanwhile, in FIG. 3, in transmission of a plurality of segments, some symbols may be unavailable for the UL transmission (for example, the symbols are used for DL channel/DL signal allocation). For example, some symbols of one segment (repetition #2-1) among a plurality of segments (for example, repetitions #2-1 and #2-2) may be unavailable. In such a case, how to control the transmission of the UL channel/UL signal in the plurality of segments becomes a problem.

The present inventors have studied a transmission control in a case where symbols in some segments are unavailable for UL transmission for the UL channel/UL signal transmitted while being divided into a plurality of segments, and conceived one aspect of the present invention.

Hereinafter, embodiments according to the present disclosure will be described in detail with reference to the drawings. Note that the following first and second aspects may be used alone, or may be applied by combining at least two of them. In the following description, an uplink shared channel (for example, the PUSCH) is used as an example, but applicable signals/channels are not limited thereto. For example, the PUSCH may be replaced with a PUCCH, a PRACH, or an SRS. Alternatively, the present embodiment may be applied by replacing the PUSCH with the PDSCH and replacing the transmission with the reception.

(First Aspect)

In a first aspect, a UE operation in a case where at least one of a plurality of UL channel/UL signal (for example, the PUSCH) transmissions configured in a given time unit (for example, one slot) includes symbols unavailable for UL transmission will be described.

In the following description, an example in which PUSCH transmission using four symbols is performed three times in one slot (for example, the repetition factor K=3) will be described, but a symbol length and the repetition number of the PUSCH are not limited thereto. In addition, a plurality of symbols for PUSCH transmission (for example, contiguous symbols) configured in one symbol will be described as a set of symbols, but the definition of the set of symbols is not limited thereto. Symbols corresponding to one PUSCH transmission may be referred to as the set of symbols.

Figure 4:
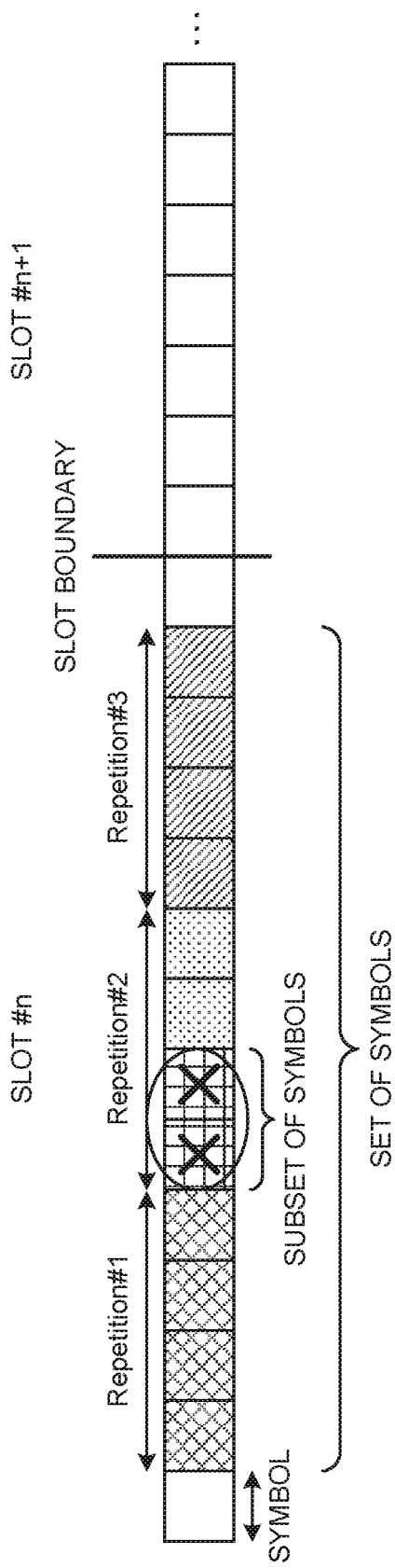
FIG. 4 is a diagram illustrating an example of a case where symbols unavailable for uplink (UL) transmission are configured in some of a plurality of PUSCH transmissions configured in one slot.

FIG. 4 illustrates an example of a case where three PUSCH transmissions (here, repetitions #1 to #3) are configured in a given slot (here, the slot #n). Although a case where the repetitions #1 to #3 are configured by using contiguous symbols (the set of symbols) in one slot is illustrated, but the repetitions #1 to #3 may be configured by using non-contiguous symbols. The PUSCH transmission may be configured by higher layer signaling or a combination of higher layer signaling and the DCI.

In addition, FIG. 4 illustrates a case where some symbols (the subset of symbols) of the set of symbols are unavailable for PUSCH transmission. Here, the first two symbols among four symbols constituting the repetition #2 correspond to symbols (unavailable symbols) that are unavailable for PUSCH transmission.

The symbols unavailable for PUSCH transmission may be symbols in which a DL channel/DL signal is configured by the DCI or symbols in which the slot format (for example, at least one of DL or flexible) other than UL is designated by the DCI. Alternatively, the symbol unavailable for PUSCH transmission may be a signal (for example, UL cancellation indication signaling) indicating cancellation of UL transmission by at least one of the DCI or higher layer signaling.

The UE may control PUSCH transmission processing (for example, whether or not the transmission is performed) on the basis of at least one of the following Options 1-1 to 1-5.

<Option 1-1>

Figure 5A:
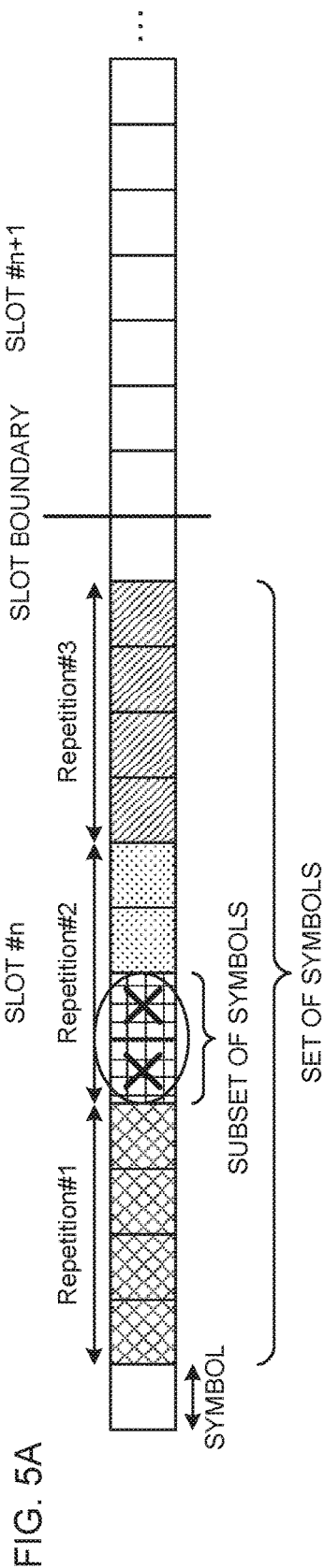
FIGS. 5A to 5C are diagrams illustrating an example of a control of a plurality of PUSCH transmissions configured in one slot.

The UE performs a control so that PUSCH transmission in symbols (the subset of symbols) unavailable for PUSCH transmission is not performed (or canceled) (see FIG. 5A). That is, the UE may drop the subset of symbols.

For example, the UE does not perform PUSCH transmission in a symbol unavailable for PUSCH transmission in the set of symbols, and performs the PUSCH transmission in other symbols. Here, the PUSCH transmission is not performed in some symbols included in the repetition #2, and may be performed using the remaining symbols of the repetition #2, the symbols of the repetition #1, and the symbols of the repetition #3.

As a result, it is possible to perform PUSCH transmission by using symbols other than the subset of symbols among the symbols configured for PUSCH transmission in one slot.

<Option 1-2>

Figure 5B:
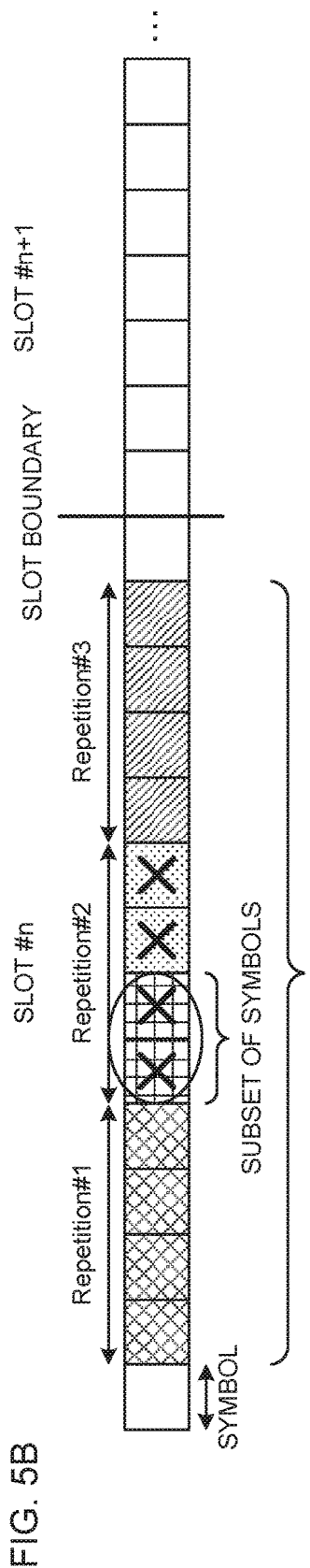

The UE performs a control so that PUSCH transmission including symbols (the subset of symbols) unavailable for PUSCH transmission is not performed (or canceled) (see FIG. 5B). That is, the UE may drop the symbols corresponding to the PUSCH including the subset of symbols.

For example, the UE does not perform PUSCH transmission for a PUSCH (or repetitive transmission or transmission occasion) that at least partially overlaps with symbols unavailable for PUSCH transmission in the set of symbols, and performs PUSCH transmission in other symbols. Here, the PUSCH transmission is not performed in the symbols corresponding to the repetition #2, and the PUSCH transmission may be performed using the symbols of the repetition #1 and the symbols of the repetition #3.

As a result, it is possible to perform a control so that PUSCH transmission (or PUSCH transmission with a higher coding rate) using a small number of symbols is not performed. As a result, a processing load of a transmission operation of the UE can be reduced.

<Option 1-3>

Figure 5C:
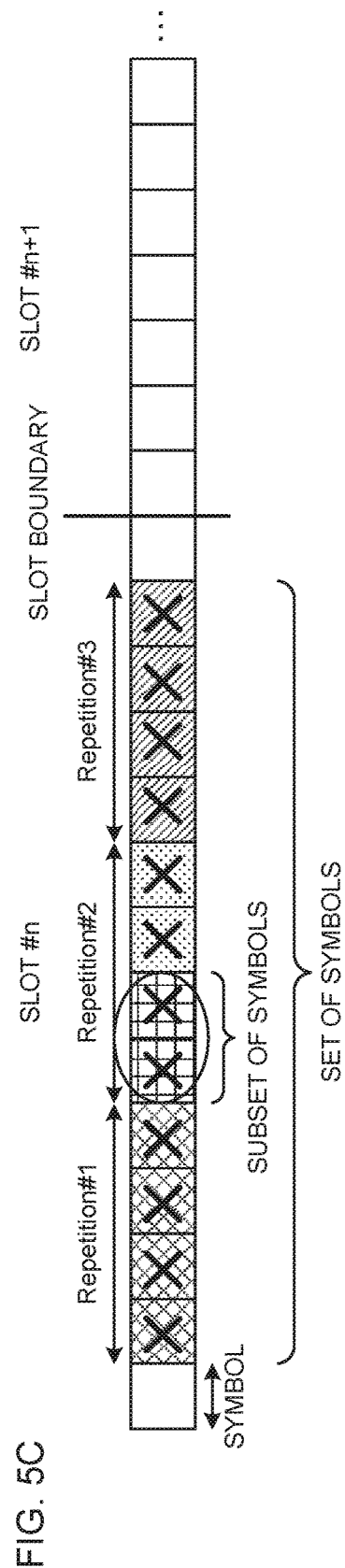

The UE performs a control so that PUSCH transmission is not performed (or canceled) in the set of symbols including the symbols (the subset of symbols) unavailable for the PUSCH transmission (see FIG. 5C). That is, the UE may drop the set of symbols.

For example, in a case where symbols corresponding to at least one PUSCH of a plurality of PUSCHs configured in one slot include a symbol unavailable for PUSCH transmission, the UE may perform a control so that all PUSCH transmissions are not performed in the slot. Here, since some of symbols corresponding to the repetition #2 include symbols unavailable for PUSCH transmission, PUSCH transmission using the symbols corresponding to the repetitions #1 to #3, respectively, is not performed.

Therefore, a transmission control (for example, whether or not to cancel or drop) can be determined in units of sets of symbols, such that the UE operation can be simplified.

<Option 1-4>

The UE may control PUSCH transmission processing (for example, whether or not to perform transmission) on the basis of a redundancy version (RV) applied to PUSCH transmission including symbols unavailable for the PUSCH transmission.

[Redundancy Version]

In a case where transmission of a plurality of shared channels (for example, the PUSCHs) or PUSCH repetitive transmission is performed, a given redundancy version (RV) is applied to each PUSCH transmission.

In a case where repetitive transmission of the PUSCH (or TB) is performed over a plurality of transmission occasions, the RV applied to the n-th transmission occasion of the TB may be determined on the basis of a given rule. For example, for PUSCH repetitive transmission scheduled by a PDCCH (or DCI) that is cyclic redundancy check (CRC)-scrambled using a given radio network temporary identifier (RNTI), the RV may be determined on the basis of information notified by the DCI and an index of a transmission occasion.

The UE may determine the RV (which may be read as an RV index, an RV value, or the like) corresponding to the n-th repetition on the basis of a value of a given field (for example, an RV field) in the DCI for scheduling the repetition of the PDSCH. Note that, in the present disclosure, the n-th repetition may be read as the (n−1) th repetition (for example, the first repetition may be expressed as the 0-th repetition).

For example, the UE may determine the RV index to be applied to the first repetition on the basis of a 2-bit RV field. For example, the value of the RV field being "00", "01", "10", and "11" may correspond to the RV index of the first repetition being "0", "1", "2", and "3", respectively.

In addition, for repetition of the PUSCH, only a specific RV sequence may be supported. The specific RV sequence may be an RV sequence (for example, an RV sequence {#0, #2, #3, #1}) including different RV indexes (not including the same RV index). Note that, in the present disclosure, the RV sequence may include one or more RV indexes.

In addition, for repetition of the PUSCH, more than one RV sequences may be supported. More than one RV sequences may include, for example, RV sequences {#0, #2, #3, #1}, {#0, #3, #0, #3}, {#0, #0, #0, #0}, and the like. The number of applied RV sequences may be set according to a transmission type. For example, one RV sequence may be applied to dynamic-based PUSCH transmission in which the PUSCH is scheduled by the DCI, and a plurality of RV sequences may be applied to configuration grant-based PUSCH transmission.

The UE may configure at least one of more than one RV sequences by higher layer signaling for PUSCH repetition. For example, the UE may determine the RV index to be applied to the first repetition among the configured RV sequences on the basis of a 2-bit RV field. The UE may determine, on the basis of the RV index applied to the first repetition, the RV index applied to the n-th repetition (transmission occasion), as described above in first mapping.

For example, in (for example, configuration grant-based) PUSCH transmission configured by higher layer signaling, at least one of RV sequences {#0, #2, #3, #1}, {#0, #3, #0, #3}, and {#0, #0, #0, #0} may be configured by higher layer signaling.

The UE may control transmission processing (for example, dropping or canceling) of the PUSCH transmission on the basis of the RV value applied to the PUSCH transmission (or a PUSCH that can be transmitted using all symbols) that does not include symbols unavailable for the PUSCH transmission. For example, a given option may be selected from Options 1-1, 1-2, and 1-3 on the basis of whether or not a specific RV is applied to PUSCH transmission that does not include symbols unavailable for the PUSCH transmission, and may be applied.

The specific RV value may be a self-decodable RV. The self-decodable RV may be an RV (for example, RV=0 and/or 3) including many bits related to system information (systematic bits). By receiving a PUSCH to which the self-decodable RV is applied, it is possible to increase the probability that decoding can be performed on the basis of the PUSCH to which the RV is applied. For example, the specific RV value may be 0, or may be 0 and 3.

As an example, Option 1-2 (or Option 1-1) may be applied in a case where a specific RV (for example, RV=0) is applied to PUSCH transmission that does not include symbols unavailable for the PUSCH transmission. On the other hand, Option 1-3 may be applied in a case where a specific RV (for example, RV=0) is not applied to PUSCH transmission that does not include symbols unavailable for the PUSCH transmission.

Figure 6A:
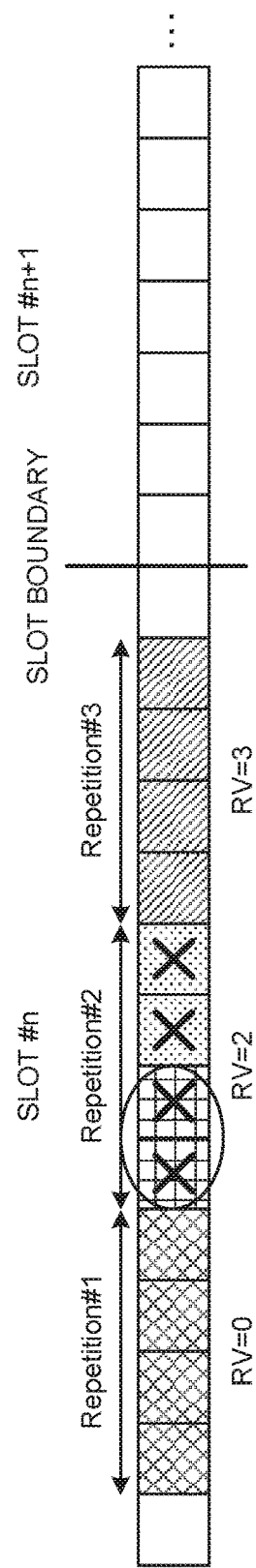
FIGS. 6A and 6B are diagrams illustrating another example of the control of a plurality of PUSCH transmissions configured in one slot.

FIG. 6A illustrates a case where a specific RV (for example, RV=0) is applied to PUSCH transmission (for example, the repetition #1 or #3) that does not include symbols unavailable for the PUSCH transmission. That is, an RV other than the specific RV is applied to PUSCH transmission (for example, the repetition #2) including symbols unavailable for the PUSCH transmission. In this case, the UE may perform a control so that transmission of the repetition #2 is not performed and may perform a control so that transmissions of the repetitions #1 and #3 are performed. Note that the UE may transmit only the repetition #1 to which the specific RV is applied.

As described above, by transmitting the PUSCH to which the self-decodable RV is applied and for which there is no symbol unavailable for UL transmission, even in a case where some PUSCH transmissions are dropped, a base station can appropriately receive the transmitted PUSCHs.

Figure 6B:
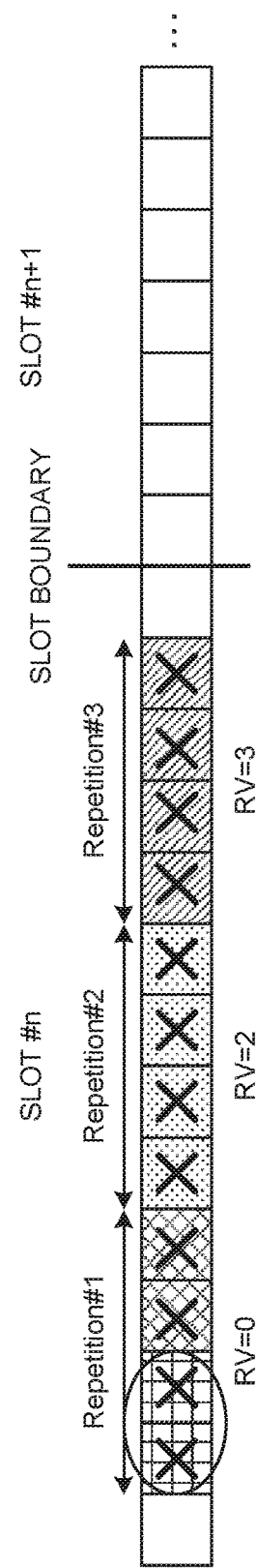

In FIG. 6B, a specific RV is applied to PUSCH transmission (for example, the repetition #1) including symbols unavailable for the PUSCH transmission (unavailable symbols). That is, a case where a specific RV (for example, RV=0) is not applied to PUSCH transmission (for example, the repetition #2 or #3) that does not include symbols unavailable for the PUSCH transmission is illustrated. In this case, the UE may perform a control so that transmissions of the repetitions #1 to #3 are not performed (for example, the set of symbols is dropped).

As described above, in a case where the specific RV is not applied to the PUSCH for which there is no symbol unavailable for UL transmission, it is possible to suppress the PUSCH transmission having a high possibility of a transmission error by performing a control so that the PUSCH transmission in the slot is not performed, and to suppress an increase in processing load of the UE. Note that the specific RV may include a plurality of RVs (for example, RV=0 and 3), and in this case, a control may be performed so that at least the repetition #3 is transmitted (alternatively, only the repetition #1 is dropped) in FIG. 6B.

By controlling the transmission processing of each PUSCH transmission on the basis of the RV value applied to the PUSCH transmission other than the PUSCH transmission including the symbols unavailable for UL transmission, it is possible to improve the transmission probability and suppress the unnecessary transmission processing.

(Second Aspect)

In a second aspect, a UE operation in a case where at least one of a plurality of segments (multi-segment) includes symbols unavailable for UL transmission will be described.

In the following description, a case where PUSCH transmission using seven symbols is configured over the slot boundary (or across the slot boundary), and the PUSCH transmission is performed while being divided into two segments on the basis of the slot boundary will be described as an example, but the symbol length and the number of segments of the PUSCH are not limited thereto. In addition, the following aspects can be applied to at least one of a channel/signal to which repetitive transmission (also referred to as repetition or nominal repetition) is applied or a channel/signal to which repetitive transmission is not applied (alternatively, the repetition number is 1).

Figure 7:
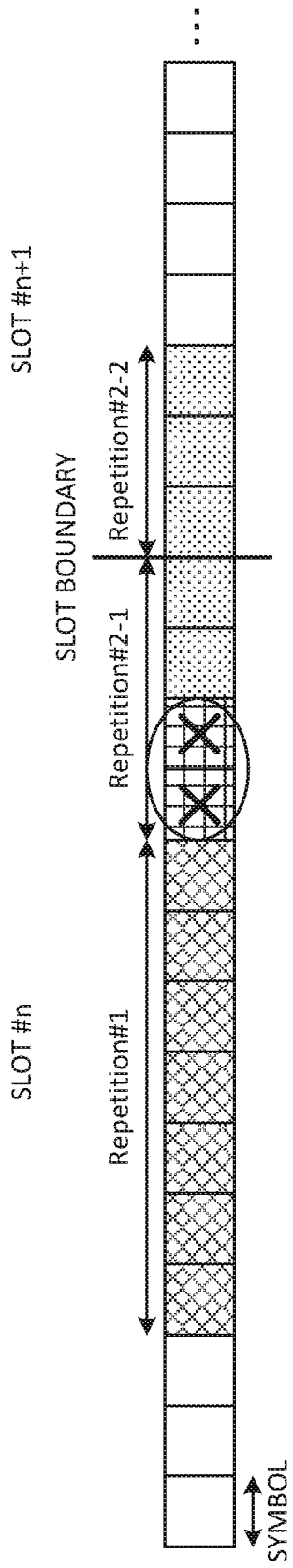
FIG. 7 is a diagram illustrating an example of a case where symbols unavailable for UL transmission are configured in some of a plurality of segments.

FIG. 7 illustrates an example of a case where some (here, the repetition #2) of the PUSCH repetitive transmissions is configured over a plurality of slots (here, the slot #n and the slot #n+1). The PUSCH transmission may be configured by higher layer signaling or a combination of higher layer signaling and the DCI.

For example, the UE performs PUSCH transmission (here, the repetition #2) configured across the slot boundary in a divided manner into two segments. The two segments may be referred to as repetitions #2-1 and #2-2.

FIG. 7 illustrates a case where at least one of symbols corresponding to some of a plurality of segments is unavailable for PUSCH transmission. Here, the first two symbols among four symbols constituting the repetition #2-1 correspond to symbols (unavailable symbols) that are unavailable for PUSCH transmission.

The symbols unavailable for PUSCH transmission may be symbols in which a DL channel/DL signal is configured by the DCI or symbols in which the slot format (for example, at least one of DL or flexible) other than UL is designated by the DCI. Alternatively, the symbol unavailable for PUSCH transmission may be a signal (for example, UL cancellation indication signaling) indicating cancellation of UL transmission by at least one of the DCI or higher layer signaling.

The UE may control PUSCH transmission processing (for example, whether or not the transmission is performed) on the basis of at least one of the following Options 2-1 to 2-3.

<Option 2-1>

In a case where symbols unavailable for PUSCH transmission are included in at least one of a plurality of segments, the UE performs a control so that PUSCH transmission using each segment is not performed (or dropped or canceled) (see FIG. 8A). That is, the UE performs a control so that the transmission processing (for example, dropping)

is performed in consideration of the PUSCH transmission (here, the repetition #2) before being divided into a plurality of segments (or the repetitions #2-1 and #2-2).

As a result, the UE can control the PUSCH transmission regardless of whether or not the PUSCH transmission is divided into a plurality of segments, such that the complexity of the UE can be reduced.

<Option 2-2>

In a case where symbols unavailable for PUSCH transmission are included in at least one of a plurality of segments, the UE performs a control so that PUSCH transmission using the segment (repetition #2-1) including the symbols is not performed (or dropped or canceled) (see FIG. 8B). On the other hand, PUSCH transmission may be performed using another segment (repetition #2-2) that does not include symbols unavailable for PUSCH transmission.

That is, the UE performs a control so that the transmission processing (for example, dropping) is performed in consideration of each PUSCH transmission after the PUSCH transmission (here, the repetition #2) is divided into a plurality of segments (or the repetitions #2-1 and #2-2).

As a result, even in a case where some symbols (for example, some segments) corresponding to PUSCH transmission include symbols unavailable for UL transmission, PUSCH transmission can be performed using another segment.

<Option 2-3>

In a case where symbols unavailable for UL transmission are included in a given segment of the plurality of segments, whether to drop the PUSCH transmission using the given segment or to drop the PUSCH transmission using the plurality of segments (for example, all segments) may be determined on the basis of given conditions and/or configurations.

The given conditions and/or configurations may be at least one of an applied RV value or a coding rate.

For example, in a case where symbols unavailable for UL transmission are included in the repetition #2-1, the UE may determine whether or not to transmit the repetition #2-2 on the basis of a transmission condition or a transmission parameter of PUSCH transmission using the repetition #2-2 that does not include the symbols.

As an example, the UE drops or cancels a plurality of segments in a case where the coding rate of the repetition #2-2 is larger than a certain value (Option 2-1 is applied) (see FIG. 9A). As a result, it is possible to cancel the PUSCH transmission that is likely to fail, and thus, it is possible to reduce the processing load of the UE.

On the other hand, in a case where the coding rate of the repetition #2-2 is equal to or less than the certain value, the UE may perform a control to drop the given segment (repetition #2-1) and transmit the other segment (repetition #2-2) (Option 2-2 is applied) (see FIG. 9B). As a result, the PUSCH transmission can be performed using some segments.

<Variations>

In a case where symbols unavailable for UL transmission are included in the repetition #2-1, the UE may determine whether or not to transmit the repetition #2-2 on the basis of an RV applied to the repetition #2-2 that does not include the symbols.

For example, in a case where the RV value of the repetition #2-2 is a specific value, the UE may perform a control to drop the given segment (repetition #2-1) and transmit the other segment (repetition #2-2) (Option 2-2 is applied) (see FIG. 10A).

The specific RV value may be a self-decodable RV. The self-decodable RV may be an RV (for example, RV=0 and/or 3) including many bits related to system information (systematic bits). By receiving a PUSCH to which the self-decodable RV is applied, it is possible to increase the probability that decoding can be performed on the basis of the PUSCH to which the RV is applied. For example, the specific RV value may be only 0, or may be 0 and 3.

FIG. 10A illustrates a case where the UE performs a control to drop the repetition #2-1 and transmit the repetition #2-2 since RV=0 is applied to the repetition #2-2. As a result, the PUSCH transmission can be performed using some segments.

On the other hand, in a case where the RV value of the repetition #2-2 is a value other than the specific value, a plurality of segments (for example, the repetitions #2-1 and #2-2) may be dropped or canceled (Option 2-1 is applied) (see FIG. 10B). FIG. 10B illustrates a case where the UE performs a control to drop the repetitions #2-1 and #2-2 since RV=2 is applied to the repetition #2-2.

Note that a control may be performed so that PUSCH transmission is performed using the remaining symbols except for symbols unavailable for UL transmission in the repetition #2-1. For example, in a case where a transmission condition (for example, at least one of the coding rate or the RV value) using an uplink symbol satisfies a given condition, the UE may transmit the PUSCH by using the remaining symbols of the repetition #2-1.

In addition, the RV value corresponding to each segment (for example, the repetitions #2-1 and #2-2) may be set in common or may be set separately. In addition, the RV value corresponding to the PUSCH transmission (for example, the repetition #2) before the division may be commonly applied to each segment after the division, or may be applied to one of the segments.

(Radio Communication System)

Hereinafter, a configuration of a radio communication system according to one embodiment of the present disclosure will be described. In this radio communication system, communication is performed using one or a combination of the radio communication methods according to the embodiments of the present disclosure.

Figure 11:
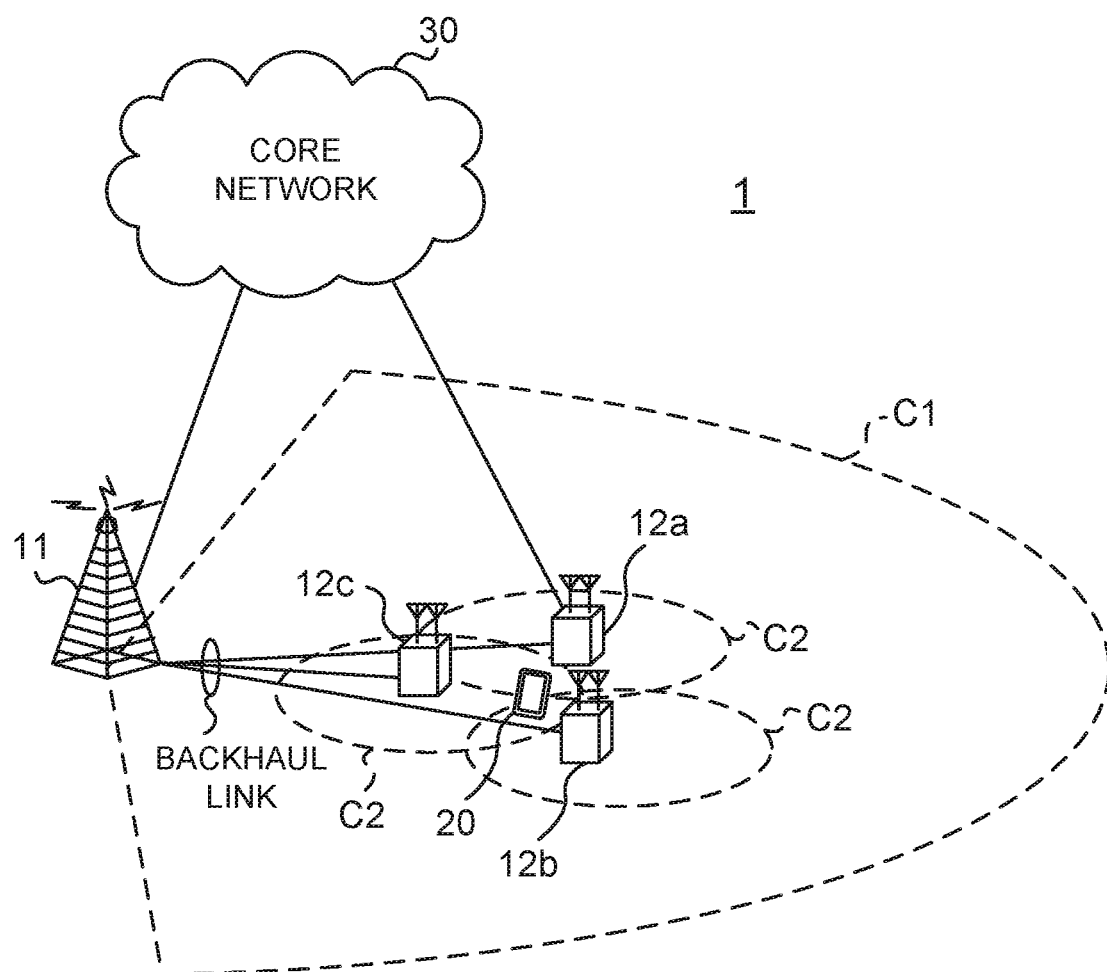
FIG. 11 is a diagram illustrating an example of a schematic configuration of a radio communication system according to one embodiment.

FIG. 11 is a diagram illustrating an example of a schematic configuration of the radio communication system according to one embodiment. A radio communication system 1 may be a system that implements communication using long term evolution (LTE), 5th generation mobile communication system New Radio (5G NR), and the like drafted as the specification by 3rd generation partnership project (3GPP).

Furthermore, the radio communication system 1 may support dual connectivity between a plurality of radio access technologies (RATs) (multi-RAT dual connectivity (MR-DC)). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are arranged in the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range (frequency range 1 (FR1)) or a second frequency range (frequency range 2 (FR2)). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of the FR1 and FR2 are not limited thereto, and, for example, FR1 may correspond to a frequency range higher than FR2.

Further, the user terminal 20 may perform communication on each CC using at least one of time division duplex (TDD) or frequency division duplex (FDD).

The plurality of base stations 10 may be connected to each other in a wired manner (for example, an optical fiber, an X2 interface, or the like in compliance with common public radio interface (CPRI)) or in a wireless manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), or the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method or another multi-carrier transmission method) may be used as the UL and DL radio access methods.

In the radio communication system 1, a downlink shared channel (physical downlink shared channel (PDSCH)) shared by the user terminals 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by the user terminals 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. User data, higher layer control information, and the like may be transmitted on the PUSCH. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that, the DCI for scheduling the PDSCH may be referred to as DL assignment, DL DCI, or the like, and the DCI for scheduling the PUSCH may be referred to as UL grant, UL DCI, or the like. Note that, the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a certain search space on the basis of search space configuration.

One search space may correspond to a PDCCH candidate corresponding to one or more aggregation levels. One or more search spaces may be referred to as a search space set. Note that the terms "search space", "search space set", "search space configuration", "search space set configuration", "CORESET", "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that, in the present disclosure, downlink, uplink, and the like may be expressed without "link". Furthermore, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, the DMRS may also be referred to as a user terminal-specific reference signal (UE-specific reference signal).

(Base Station)

Figure 12:
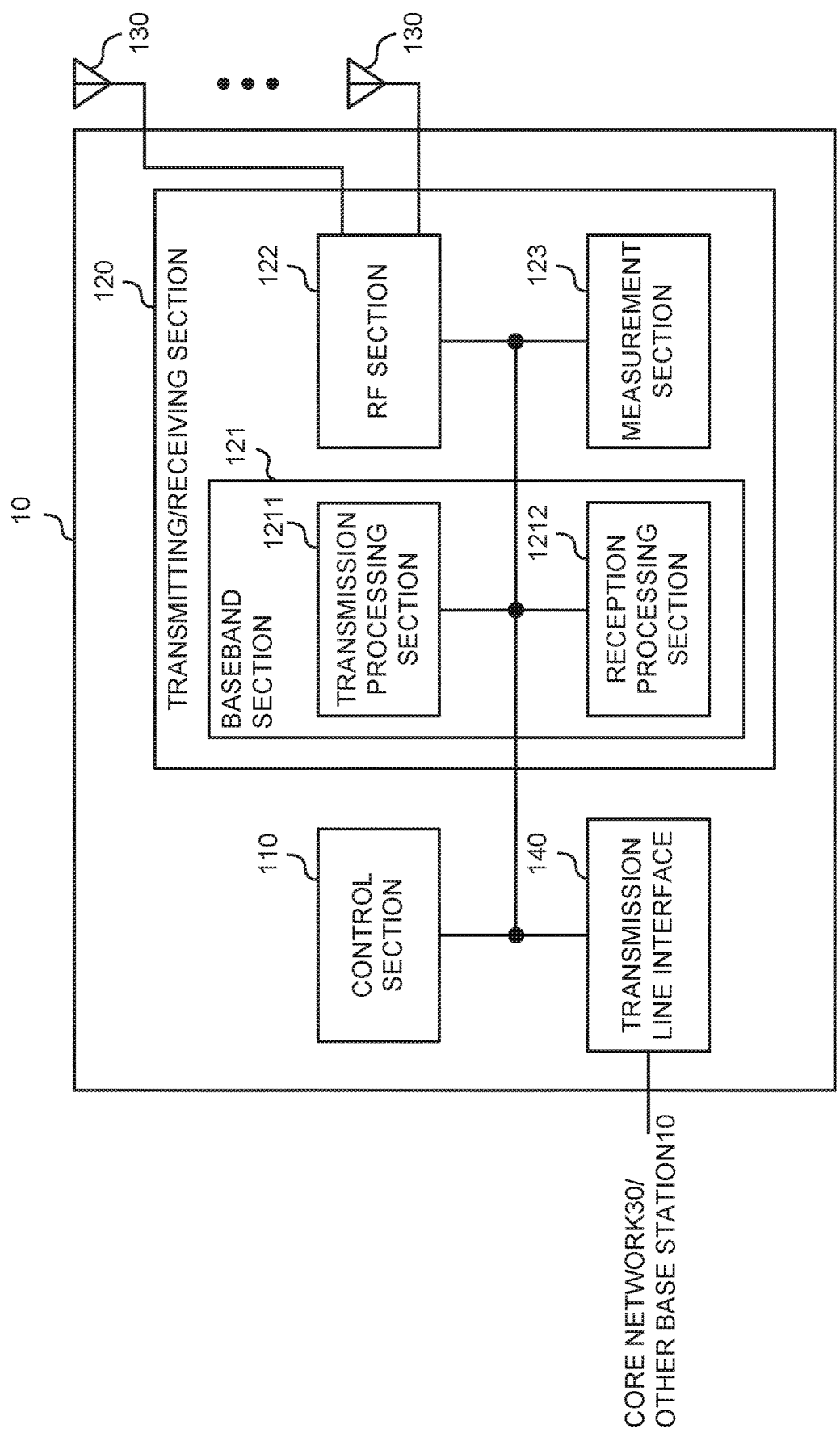
FIG. 12 is a diagram illustrating an example of a configuration of a base station according to one embodiment.

FIG. 12 is a diagram illustrating an example of a configuration of the base station according to one embodiment. The base station 10 includes a control section 110, a transmitting/receiving section 120, a transmission/reception antenna 130, and a transmission line interface 140. Note that one or more control sections 110, one or more transmitting/receiving sections 120, one or more transmission/reception antennas 130, and one or more transmission line interfaces 140 may be provided.

Note that, although this example mainly describes functional blocks of a characteristic part of the present embodiment, it may be assumed that the base station 10 includes other functional blocks that are necessary for radio communication as well. A part of processing performed by each section described below may be omitted.

The control section 110 controls the entire base station 10. The control section 110 can include a controller, a control circuit, and the like, which are described on the basis of common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or releasing) of a communication channel, state management of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 120 may be configured as an integrated transmitting/receiving section, or may include a transmitting section and a receiving section. The transmitting section may include the transmission processing section 1211 and the RF section 122. The receiving section may include the reception processing section 1212, the RF section 122, and the measurement section 123.

The transmission/reception antenna 130 can include an antenna, which is described on the basis of common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a Tx beam or a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency range, filtering processing, amplification, and the like on the baseband signal, and may transmit a signal in the radio frequency range via the transmission/reception antenna 130.

Meanwhile, the transmitting/receiving section 120 (RF section 122) may perform amplification, filtering processing, demodulation to a baseband signal, and the like on the signal in the radio frequency range received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like on the basis of the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus included in the core network 30, another base station 10, or the like, and may perform acquisition, transmission, or the like of user data (user plane data), control plane data, and the like for the user terminal 20.

Note that, the transmitting section and the receiving section of the base station 10 in the present disclosure may include at least one of the transmitting/receiving section 120, the transmission/reception antenna 130, or the transmission line interface 140.

Note that the transmitting/receiving section 120 may transmit information for indicating or configuring transmission of an uplink channel/uplink signal. For example, the transmitting/receiving section 120 may configure repetitive transmission in one slot by using higher layer signaling (or higher layer signaling and downlink control information). In addition, the transmitting/receiving section 120 may notify information regarding symbols unavailable for UL transmission by using at least one of the DCI or higher layer signaling.

In a case where symbols unavailable for uplink channel transmission are configured for at least one of a plurality of uplink channel transmissions configured in one slot, the control section 110 may control reception processing on the assumption that at least the uplink channel transmission in the symbols is not performed.

In a case where the uplink channel is transmitted while being divided into a plurality of segments, when at least one segment includes symbols unavailable for uplink channel transmission, the control section 110 may control the reception processing on the assumption that at least the uplink channel transmission in the segment including the symbols is not performed.

(User Terminal)

Figure 13:
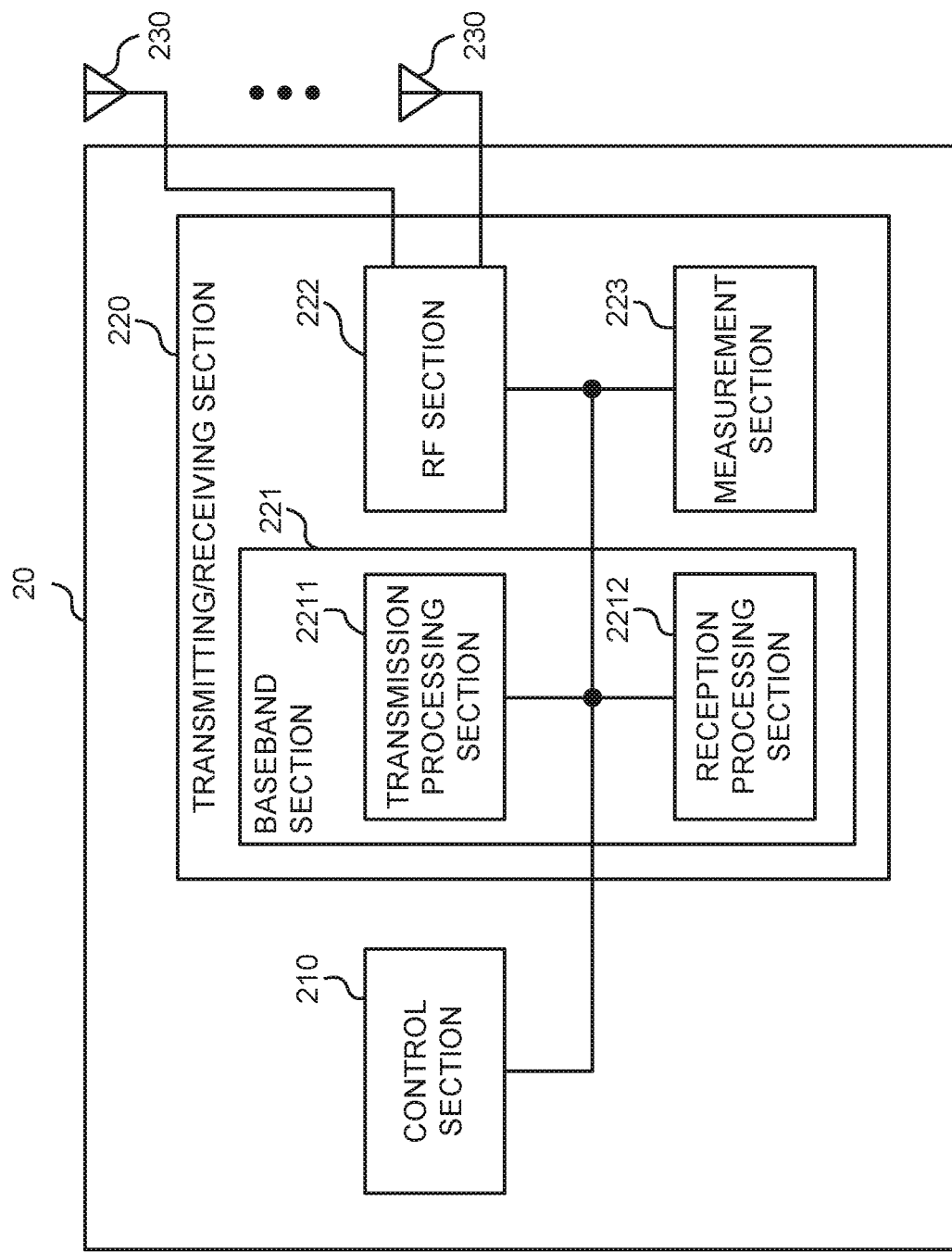
FIG. 13 is a diagram illustrating an example of a configuration of a user terminal according to one embodiment.

FIG. 13 is a diagram illustrating an example of a configuration of the user terminal according to one embodiment. The user terminal 20 includes a control section 210, a transmitting/receiving section 220, and a transmission/reception antenna 230. Note that one or more control sections 210, one or more transmitting/receiving sections 220, and one or more transmission/reception antennas 230 may be provided.

Note that, although this example mainly describes functional blocks of a characteristic part of the present embodiment, it may be assumed that the user terminal 20 includes other functional blocks that are necessary for radio communication as well. A part of processing performed by each section described below may be omitted.

The control section 210 controls the entire user terminal 20. The control section 210 can include a controller, a control circuit, and the like, which are described on the basis of common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like, which are described on the basis of common recognition in the technical field related to the present disclosure.

The transmitting/receiving section 220 may be configured as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmission/reception antenna 230 can include an antenna, which is described on the basis of common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, or the like acquired from the control section 210 to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined on the basis of configuration of transform precoding. When transform precoding is enabled for a channel (for example, PUSCH), the transmitting/receiving section 220 (transmission processing section 2211) may perform DFT processing as the above-described transmission processing in order to transmit the channel by using a DFT-s-OFDM waveform, and if not, the DFT processing does not have to be performed as the transmission processing.

The transmitting/receiving section 220 (RF section 222) may perform modulation to a radio frequency range, filtering processing, amplification, and the like on the baseband signal, and may transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 220 (measurement section 223) may perform measurement on the received signal. For example, the measurement section 223 may perform RRM measurement, CSI measurement, and the like on the basis of the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 or the transmission/reception antenna 230.

Note that the transmitting/receiving section 220 may receive information for indicating or configuring transmission of an uplink channel/uplink signal. For example, for the transmitting/receiving section 220, repetitive transmission in one slot may be configured by higher layer signaling (or higher layer signaling and downlink control information). In addition, the transmitting/receiving section 220 may receive information regarding symbols unavailable for UL transmission by using at least one of the DCI or higher layer signaling.

In a case where at least one of a plurality of uplink channel transmissions configured in one slot includes a symbol unavailable for the uplink channel transmission, the control section 210 control not to transmit the uplink channel in at least the symbol. Furthermore, the control section 210 may perform a control so that the uplink channel transmission including the symbols or the plurality of uplink channel transmissions configured in one slot are not performed.

In a case where the uplink channel transmission is divided into a plurality of segments and in a case where at least one of the segments includes a symbol unavailable for the uplink channel transmission, the control section 210 may control not to transmit the uplink channel in the segment including at least the symbol. Furthermore, the control section 210 may perform a control so that uplink channel transmission in a plurality of segments is not performed.

(Hardware Configuration)

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a wireless manner, or the like, for example) and using these apparatuses. The functional blocks may be implemented by combining software with the above-described single apparatus or the above-described plurality of apparatuses.

Here, the function includes, but is not limited to, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 14:
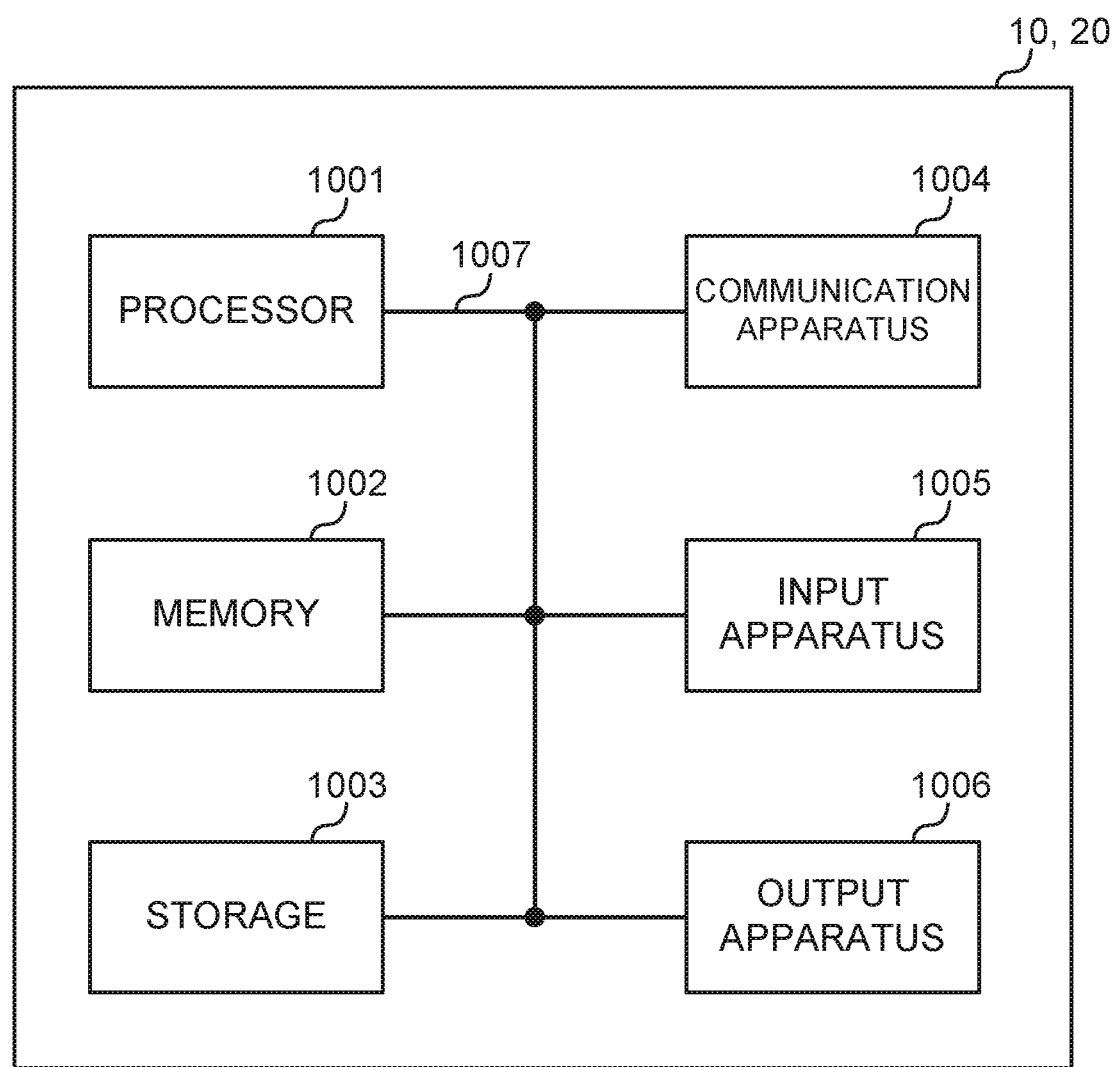
FIG. 14 is a diagram illustrating an example of a hardware configuration of the base station and the user terminal according to one embodiment.

For example, the base station, the user terminal, or the like according to one embodiment of the present disclosure may function as a computer that executes the processing of the radio communication method in the present disclosure. FIG. 14 is a diagram illustrating an example of a hardware configuration of the base station and the user terminal according to one embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may include one or more of each of the apparatuses illustrated in the drawings, or does not have to include some apparatuses.

For example, although only one processor 1001 is illustrated, a plurality of processors may be provided. Further, the processing may be executed by one processor, or the processing may be executed by two or more processors simultaneously or sequentially, or by using other methods. Note that the processor 1001 may be implemented by one or more chips.

Each of functions of the base station 10 and the user terminal 20 is, for example, implemented by causing given software (program) to be read on hardware such as the processor 1001 or the memory 1002 to thereby cause the processor 1001 to perform operation, control communication via the communication apparatus 1004, and control at least one of reading or writing of data from or in the memory 1002 and the storage 1003.

The processor 1001 may control the entire computer by operating, for example, an operating system. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program code), software modules, data, and so on from at least one of the storage 1003 or the communication apparatus 1004 into the memory 1002, and executes various types of processing according to these. As the program, a program that causes a computer to execute at least a part of the operation described in the above-described embodiment is used. For example, the control section 110 (210) may be implemented by a control program that is stored in the memory 1002 and that operates on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store a program (program code), a software module, and the like, which are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus".

The communication apparatus 1004 is hardware (transmitting/receiving device) for performing inter-computer communication via at least one of a wired network or a wireless network, and for example, is referred to as "network device", "network controller", "network card", "communication module", and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmission/reception antenna 130 (230), and the like described above may be implemented by the communication apparatus 1004. The transmitting/receiving section 120 (220) may be implemented in a physically or logically separated manner by the transmitting section 120a (220a) and the receiving section 120b (220b).

The input apparatus 1005 is an input device that receives input from the outside (for example, a keyboard, a mouse, a microphone, a switch, a button, a sensor, or the like). The output apparatus 1006 is an output device that performs output to the outside (for example, a display, a speaker, a light emitting diode (LED) lamp, or the like). Note that the input apparatus 1005 and the output apparatus 1006 may be integrated with each other (for example, a touch panel).

Further, these apparatuses such as the processor 1001 and the memory 1002 are connected to each other by the bus 1007 to communicate information. The bus 1007 may be configured by using a single bus, or may be configured by using a different bus for each apparatus.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented with at least one of these pieces of hardware.

(Modification)

Note that terms described in the present disclosure and terms necessary for understanding the present disclosure may be replaced with terms that have the same or similar meanings. For example, a channel, a symbol, and a signal (signal or signaling) may be interchangeable. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or more periods (frames) in the time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, specific windowing processing performed by a transceiver in the time domain, and the like.

The slot may include one or more symbols in the time domain (orthogonal frequency division multiplexing (OFUM) symbols, single carrier frequency division multiple access (SC-FDMA) symbols, and the like). Also, the slot may be a time unit based on the numerology.

The slot may include a plurality of mini slots. Each mini slot may include one or more symbols in the time domain. Further, the mini slot may be referred to as a sub-slot. Each mini slot may include fewer symbols than the slot. A PDSCH (or PUSCH) transmitted in a time unit larger than the mini slot may be referred to as "PDSCH (PUSCH) mapping type A". A PDSCH (or PUSCH) transmitted using the mini slot may be referred to as "PDSCH (PUSCH) mapping type B".

The radio frame, the subframe, the slot, the mini slot, and the symbol all represent the time unit in signal communication. The radio frame, the subframe, the slot, the mini slot, and the symbol may be called by other applicable names, respectively. Note that time units such as the frame, the subframe, the slot, the mini slot, and the symbol in the present disclosure may be interchangeable.

For example, one subframe may be referred to as a TTI, a plurality of consecutive subframes may be referred to as a TTI, or one slot or one mini slot may be referred to as a TTI. That is, at least one of the subframe or the TTI may be a subframe (1 ms) in the existing LTE, may be a period shorter than 1 ms (for example, one to thirteen symbols), or may be a period longer than 1 ms. Note that the unit to represent the TTI may be referred to as a "slot," a "mini slot" and the like, instead of a "subframe".

Here, the TTI refers to the minimum time unit of scheduling in radio communication, for example. For example, in the LTE system, a base station performs scheduling to allocate radio resources (a frequency bandwidth, transmit power, and the like that can be used in each user terminal) to each user terminal in TTI units. Note that the definition of the TTI is not limited thereto.

The TTI may be the transmission time unit of channel-encoded data packets (transport blocks), code blocks, codewords, or the like, or may be the unit of processing in scheduling, link adaptation, or the like. Note that when the TTI is given, a time interval (for example, the number of symbols) in which the transport block, the code block, the codeword, or the like is actually mapped may be shorter than the TTI.

Note that, when one slot or one mini slot is referred to as a "TTI," one or more TTIs (that is, one or more slots or one or more mini slots) may be the minimum time unit of scheduling. Also, the number of slots (the number of mini slots) to constitute this minimum time unit of scheduling may be controlled.

A TTI having a time duration of 1 ms may also be referred to as a usual TTI (TTI in 3GPP Rel. 8 to 12), a normal TTI, a long TTI, a usual subframe, a normal subframe, a long subframe, a slot, or the like. A TTI shorter than the usual TTI may be referred to as a shortened TTI, a short TTI, a partial TTI (or fractional TTI), a shortened subframe, a short subframe, a mini slot, a sub-slot, a slot, or the like.

Note that the long TTI (for example, the usual TTI, subframe, or the like) may be replaced with a TTI having a time duration exceeding 1 ms, and the short TTI (for example, the shortened TTI or the like) may be replaced with a TTI having a TTI length less than the TTI length of the long TTI and not less than 1 ms.

A resource block (RB) is the unit of resource allocation in the time domain and the frequency domain, and may include one or more contiguous subcarriers in the frequency domain.

The number of subcarriers included in the RB may be the same regardless of the numerology, and may be twelve, for example. The number of subcarriers included in the RB may be determined on the basis of the numerology.

Also, the RB may include one or more symbols in the time domain, and may be one slot, one mini slot, one subframe, or one TTI in length. One TTI, one subframe, and the like each may include one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a certain BWP and be numbered within the BWP.

The BWP may include a BWP for UL (UL BWP) and a BWP for DL (DL BWP). For the UE, one or more BWPs may be configured within one carrier.

At least one of the configured BWPs may be active, and the UE does not need to assume to transmit or receive a given signal/channel outside the active BWP. Note that "cell", "carrier", and the like in the present disclosure may be replaced with "BWP".

Note that structures of the radio frame, subframe, slot, mini slot, symbol, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Furthermore, information, a parameter, or the like described in the present disclosure may be represented in absolute values, represented in relative values with respect to given values, or represented by using other corresponding information. For example, a radio resource may be specified by a given index.

Names used for the parameters and the like in the present disclosure are not restrictive names in any respect. Further, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented by using a variety of different technologies. For example, data, instructions, commands, information, signals, bits, symbols, chips, and the like all of which may be referenced throughout the herein-contained description, may be represented by voltages, currents, electromagnetic waves, magnetic fields or particles, optical fields or photons, or any combination of these.

Further, information, signals, and the like can be output in at least one of a direction from higher layers to lower layers or a direction from lower layers to higher layers. Information, signals, and the like may be input and output via a plurality of network nodes.

The information, signals, and the like that are input and output may be stored in a specific location (for example, in a memory), or may be managed in a control table. The information, signals, and the like to be input and output can be overwritten, updated, or appended. The output information, signals, and the like may be deleted. The information, signals, and the like that are input may be transmitted to other apparatuses.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Further, notification of given information (for example, notification of "being X") is not limited to explicit notification but may be performed implicitly (for example, by not performing notification of the given information or by performing notification of another piece of information).

Judging may be made in values represented by one bit (0 or 1), may be made in Boolean values that represent true or false, or may be made by comparing numerical values (for example, comparison with a given value).

Regardless of whether or not being referred to as software, firmware, middleware, a microcode, a hardware description language, or other names, software should be widely interpreted so as to mean an instruction, an instruction set, a code, a code segment, a program code, a program, a subprogram, a software module, an application, a software application, a software package, a routine, a subroutine, an object, an executable file, an execution thread, a procedure, a function, and the like.

Further, the software, instruction, information, and the like may be transmitted and received via a transmission medium. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology or the wireless technology is included within the definition of a transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small remote radio head (RRH) for indoors). The term "cell" or "sector" refers to a part or the whole of a coverage area of at least one of a base station or a base station subsystem that performs a communication service in this coverage.

In the present disclosure, the terms such as mobile station (MS)", "user terminal", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station or the mobile station may be referred to as a transmitting apparatus, a receiving apparatus, a radio communication apparatus, and the like. Note that at least one of the base station or the mobile station may be a device mounted on a moving body, a moving body itself, and the like. The moving body may be a transportation (for example, a car, an airplane, or the like), an unmanned moving body (for example, a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, the uplink channel, the downlink channel, and the like may be replaced with a side channel.

Similarly, the user terminal in the present disclosure may be replaced with a base station. In this case, the base station 10 may be configured to have the above-described functions of the user terminal 20.

In the present disclosure, an operation performed by a base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on".

Any reference to an element using designations such as "first" and "second" used in the present disclosure does not generally limit the amount or order of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may include a wide variety of operations. For example, "determining" may be regarded as judging, calculating, computing, processing, deriving, investigating, looking up, search, inquiry (for example, looking up in a table, database, or another data structure), ascertaining, and the like.

Furthermore, "determining" may be regarded as receiving (for example, receiving of information), transmitting (for example, transmitting of information), inputting, outputting, accessing (for example, accessing data in a memory), and the like.

Further, "determining" may be regarded as resolving, selecting, choosing, establishing, comparing, and the like. That is, "determining" may be regarded as a certain operation.

Furthermore, "determining" may be replaced with "assuming", "expecting", "considering", and the like.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

As used in the present disclosure, when two elements are connected, these elements may be considered to be "connected" or "coupled" to each other by using one or more electrical wires, cables, printed electrical connections, and the like, and, as some non-limiting and non-inclusive examples, by using electromagnetic energy and the like having wavelengths in the radio frequency, microwave, and optical (both visible and invisible) domains.

In the present disclosure, the phrase "A and B are different" may mean "A and B are different from each other". Note that the phrase may mean that "A and B are different from C". Terms such as "leave", "coupled", or the like may also be interpreted in the same manner as "different".

In a case where terms such as "include", "including", or a variation of these are used in the present disclosure, these terms are intended to be inclusive similarly to a case where "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Now, although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined on the basis of the description of claims. Thus, the description of the present disclosure is for the purpose of explaining examples and does not bring any limiting meaning to the invention according to the present disclosure.

The invention claimed is:

1. A terminal comprising:
   a processor that determines, based on an indication from downlink control information and higher layer signaling, an invalid symbol which cannot be used for uplink shared channel transmissions to which N-time repetition is applied; and
   a transmitter that, when the invalid symbol is included in a part of a plurality of symbols corresponding to k-th uplink shared channel transmission among the uplink shared channel transmissions to which N-time repetition is applied, does not perform uplink shared channel transmission using the invalid symbol but performs the k-th uplink shared channel transmission using remaining symbols.

2. The terminal according to claim 1, wherein when the uplink shared channel transmissions are configured over a first slot and a second slot, and the invalid symbol is included in a part of a plurality of symbols corresponding to an uplink shared channel in the first slot, the transmitter performs first uplink shared channel transmission using remaining symbols except for the invalid symbol in the first slot, and performs second uplink shared channel transmission in the second slot.

3. The terminal according to claim 1, wherein when a given condition is satisfied, the transmitter performs the k-th uplink shared channel transmission using the remaining symbols.

4. The terminal according to claim 2, wherein the processor controls to separately apply a redundancy version to the first uplink shared channel transmission and the second uplink shared channel transmission.

5. A radio communication method for a terminal, comprising:
   determining, based on an indication from downlink control information and higher layer signaling, an invalid symbol which cannot be used for uplink shared channel transmissions to which N-time repetition is applied; and
   when the invalid symbol is included in a part of a plurality of symbols corresponding to k-th uplink shared channel transmission among the uplink shared channel transmissions to which N-time repetition is applied, not performing uplink shared channel transmission using the invalid symbol but performing the k-th uplink shared channel transmission using remaining symbols.

6. A base station comprising:
   a processor that indicates, to a terminal using downlink control information and higher layer signaling, information about an invalid symbol which cannot be used for uplink shared channel transmissions to which N-time repetition is applied; and
   a receiver that, when the invalid symbol is included in a part of a plurality of symbols corresponding to k-th uplink shared channel transmission among the uplink shared channel transmissions to which N-time repetition is applied in the terminal, receives the k-th uplink shared channel using remaining symbols without using the invalid symbol.

7. A system comprising a terminal and a base station, wherein
   the terminal comprises:
      a processor of the terminal that determines, based on an indication from downlink control information and higher layer signaling, an invalid symbol which cannot be used for uplink shared channel transmissions to which N-time repetition is applied; and
      a transmitter that, when the invalid symbol is included in a part of a plurality of symbols corresponding to k-th uplink shared channel transmission among the uplink shared channel transmissions to which N-time repetition is applied, does not perform uplink shared channel transmission using the invalid symbol but performs the k-th uplink shared channel transmission using remaining symbols, and
   the base station comprises:
      a processor of the base station that indicates, to the terminal, information about the invalid symbol which cannot be used for the uplink shared channel transmissions; and
      a receiver that receives the k-th uplink shared channel using remaining symbols without using the invalid symbol.

8. The terminal according to claim 2, wherein when a given condition is satisfied, the transmitter performs the k-th uplink shared channel transmission using the remaining symbols.

* * * * *